Jan. 31, 1961 W. A. LOREE 2,969,612
APPARATUS FOR TREE TREATMENT AND FERTILIZING
Filed June 10, 1958
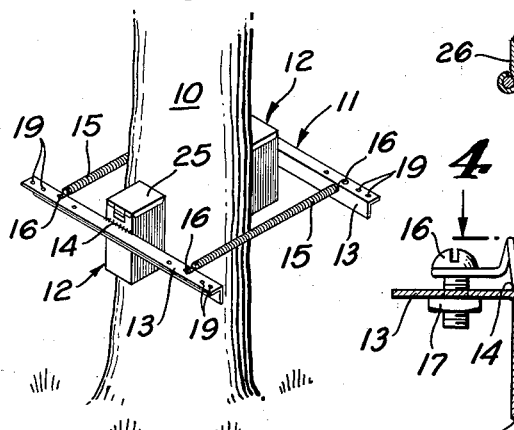
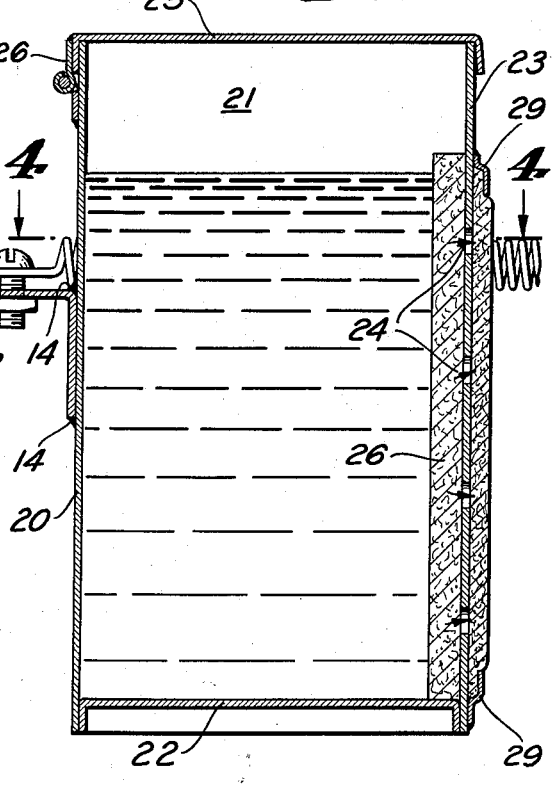
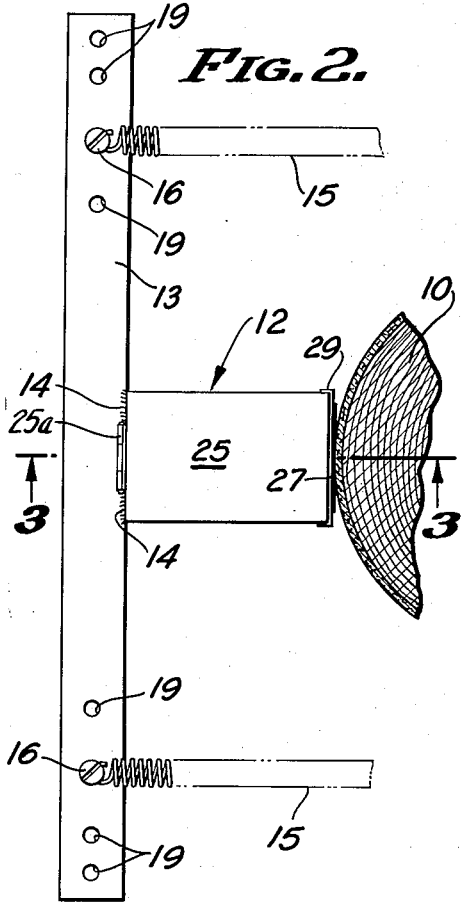
WILLIAM A. LOREE
INVENTOR.
BY *[signature]*
ATTORNEYS

United States Patent Office 2,969,612
Patented Jan. 31, 1961

2,969,612

APPARATUS FOR TREE TREATMENT AND FERTILIZING

William A. Loree, P.O. Box 284, Corona, Calif.

Filed June 10, 1958, Ser. No. 741,117

2 Claims. (Cl. 47—1)

This invention relates generally to apparatus for treating and/or fertilizing trees and more particularly to a device comprising one or more receptacles adapted to contain a liquid treatment or fertilizer and provided with means for securing the device to the trunk of citrus or other types of trees and having means for communication between the receptacles and the trunk of the tree so that the liquid is absorbed through the bark of the tree.

Accordingly it is one of the objects of this invention to provide a positive means for feeding liquid treatment or fertilizer to a trunk of a tree.

It is a further object of this invention to provide one or more liquid treatment and fertilizing devices adapted to be secured to the trunk of a tree for absorption of liquid through the bark of the tree.

It is a further object of the invention to provide a simple and economical device for treating or fertilizing citrus or other types of trees by absorption through the bark.

Other objects and novel features of the present invention will be apparent from the following specification and claims.

One embodiment of the invention is illustrated in the accompanying drawings in which:

Figure 1 is a pictorial view of the complete device mounted on the trunk of a tree;

Figure 2 is a top plan view showing one half of the device illustrated in Figure 1 and a partial cross section of a tree trunk;

Figure 3 is a cross sectional view taken on line 3—3 of Figure 2; and

Figure 4 is a cross-sectional view taken along line 4—4 of Figure 3.

Referring particularly to the figures of the accompanying drawing a tree trunk 10 has mounted thereon a preferred embodiment 11 of the invention. This embodiment comprises a pair of boxlike receptacles 12 rigidly mounted on a pair of spaced apart angle iron members 13 by a weld 14 or other suitable means and a pair of coil tension springs 15 connected to the angle irons 13 by means of bolts 16 and nuts 17 whereby the receptacles 12 are held against the trunk 10 by the tension of the springs 15 acting on the angle irons 13. A plurality of bolt holes 19 are provided on the upper leg of the angle irons 13 adjacent their outer ends thus providing a means for adjusting the position of the springs 15 to accommodate various width trees.

The boxlike receptacles 12 comprise a back 20, sides 21 and a bottom 22 formed together in a water tight manner. A front plate 23 forms a water-tight connection with the sides 21 and bottom 22, however a plurality of holes 24 are provided on the center line of the plate 23 for reasons hereinafter described. A top 25 is pivotally secured to the receptacle 12 by a strap hinge 25a secured to the back 20 whereby the top can be pivoted upwardly to fill the receptacle with a desired liquid.

Under normal use of the device the receptacles 12 are filled with a liquid which is a treatment for certain types of diseases that attack citrus trees or a liquid fertilizer may be used. Since the perforations 24 would allow the liquid to readily dispense from the receptacles 12, the flow retarding means comprising a soft absorbent pad 26 of material such as felt or sponge rubber is secured to the inside of the plate 23 by glue or other appropriate means and a second felt pad 27 secured to the front face of the plate 23 by an angle frame 29 is provided to restrict the flow of the liquid through the holes 24 so that it slowly seeps through the pad and is gradually absorbed in the bark of the tree. The felt pad 27 further provides a means of distributing the liquid to a greater surface of the bark of the tree than would be possible if the liquid were dispensed directly from the holes 24 against the bark, and also protects the bark from injury.

Although the preferred embodiment described above discloses the use of two receptacles it is readily understood that a single receptacle mounted on the trunk by a collar means could be used without departing from the spirit and scope of the invention. Therefore, it is to be understood that the preferred embodiment of the invention is for the purpose of illustration only and various changes may be made therein without departing from the spirit and scope of the invention.

What is claimed is:

1. A tree treating and fertilizing device comprising a pair of liquid receptacles adapted to be mounted adjacent the trunk of said tree, mounting means for said receptacles whereby one side of each receptacle is maintained in contact with said trunk, said one side having perforations therein whereby liquid in said receptacle is dispensed, and flow retarding means mounted on said one side to control the dispensing of said liquid.

2. A tree treating and fertilizing device comprising: two liquid receptacles; mounting means attached to one side of each of said receptacles such that said two receptacles face one another on one side thereof; perforations through each of the said sides facing one another; tension means fastening said mounting means in such manner that the two receptacles are drawn towards one another their sides having perforations facing one another, at least one of said tension means being removably mounted to said support means so that the same may be placed around a tree and fastened upon said mounting means; two absorbent pads fastened one on the inside and one on the outside of each of said perforated sides of said containers; and opening means for said receptacles into which fluid may be added.

References Cited in the file of this patent

UNITED STATES PATENTS

| | | |
|---|---|---|
| 116,001 | Gilbert | June 13, 1871 |
| 989,325 | Bremer | Apr. 11, 1911 |
| 2,217,557 | MacFee | Oct. 8, 1940 |

OTHER REFERENCES

Publications:

"Standard Cyclopedia of Horticulture," Bailey, published by Macmillan (N.Y.), 1943, volume 2, page 1892.

Rumbold: "Methods of Injecting Trees," published 1915 in Phytopathology (Magazine), vol. 5, pages 225 through 228 and Plate XIII.

Müller: "Die Innere Therapie der Pflanzen," published 1926 at Berlin, Germany, in Zeitschrift für Angewandte Entomologie, vol. 12, Beiheft 8. Pages 15 and 16 are cited.